(12) United States Patent
Nguyen et al.

(10) Patent No.: US 6,341,114 B1
(45) Date of Patent: Jan. 22, 2002

(54) UNIVERSAL LOADER PLATFORM FOR OPTICAL STORAGE DEVICE

(75) Inventors: Michael Anh Nguyen, 47 Lorong Sarhad, Sarhad Ville (SG), 119162; Tang Zheng; Low Kok Kiong, both of Singapore (SG)

(73) Assignee: Michael Anh Nguyen (SG)

( * ) Notice: Subject to any disclaimer, the term of this patent is extended or adjusted under 35 U.S.C. 154(b) by 0 days.

(21) Appl. No.: 09/274,536

(22) Filed: Mar. 23, 1999

(51) Int. Cl.[7] ............................................... G11B 33/02
(52) U.S. Cl. ..................................... 369/77.1; 369/75.1
(58) Field of Search ............................... 369/75.1, 75.2, 369/77.1, 215, 219, 244, 249; 360/99.02, 99.03, 99.06, 99.07

(56) References Cited

U.S. PATENT DOCUMENTS

| | | | | |
|---|---|---|---|---|
| 5,187,701 A | * | 2/1993 | Verheyen | 369/75.2 |
| 5,691,969 A | * | 11/1997 | Fujisawa | 369/77.1 |
| 5,732,064 A | * | 3/1998 | Huang | 369/77.1 |
| 5,768,238 A | * | 6/1998 | Tanaka | 369/75.2 |
| 5,933,408 A | * | 8/1999 | Park et al. | 369/271 |
| 6,011,766 A | * | 1/2000 | Nguyen et al. | 369/77.1 |
| 6,044,054 A | * | 3/2000 | Shiomi | 369/77.1 |
| 6,058,090 A | * | 5/2000 | Wang et al. | 369/77.1 |
| 6,067,708 A | * | 5/2000 | Wong et al. | 29/832 |

* cited by examiner

Primary Examiner—David L. Ometz
(74) Attorney, Agent, or Firm—Lawrence Y. D. Ho

(57) ABSTRACT

An universal loader platform in an optical storage disc drive which can accommodate different traverse mechanisms and the method for orienting a given traverse mechanism in such a manner as to fit into the universal loader mechanism. This is accomplished by providing an internal cavity in the loader mechanism with sufficient space to accommodate traverse mechanisms and OPU's of many different sizes and shapes. The traverse mechanism is positioned within the internal cavity in a manner whereby the lateral center of the turntable coincides with the lateral center of the tray in its fully retracted position. A suitable adapter is provided to realize the proper positioning of the traverse mechanism. A suitable chuck system is designed to match the corresponding turntable, and a lifter with a suitable lifting height is provided to ensure that the turntable at its lifted position can interact with the chuck.

8 Claims, 7 Drawing Sheets

UNIVERSAL LOADER PLATFORM FOR OPTICAL STORAGE DEVICE

FIELD OF THE INVENTION

The present invention is related to optical storage technology. In particular, the present invention is related to the loader platform for optical storage devices.

BACKGROUND OF THE INVENTION

An optical disc drive contains two main parts, the loader mechanism and the traverse mechanism. The traverse mechanism includes the optical pickup unit (OPU), a gear system, turntable and spindle motor. The loader mechanism includes a chassis, a loader tray, gear system, lifter and motor. Due to the great demand for high speed optical disc drives, the industry is constantly launching new products with increased speed, particularly in the optical pick up unit and the traverse mechanism. With each new OPU and traverse mechanism produced, a new loader system has to be designed to accommodate them. Furthermore, OPU's and traverse mechanism from different manufacturer vary from each other, such that a customized loader has to be manufactured to accommodate the differences, increasing the cost of manufacturing a optical disc drive. There is therefore a need to address the differences between the different traverse mechanisms for the purposes of minimizing the costs of tooling, manufacturing and assembling optical disc drives.

OBJECT OF THE INVENTION

It is an object of the present invention to provide a loader system which solves the problems stated above.

It is another object to provide a loader system which may be universally adapted for different OPU's and traverse mechanisms.

It is another object to provide method for designing a universal loader for optical disc drives which may be adapted for different OPU and traverse mechanisms.

SUMMARY OF THE INVENTION

The present invention provides a universal loader platform for different traverse mechanism and discloses a method for orienting a given traverse mechanism in such a manner as to fit into the universal loader. According to one feature of the present invention, there is provided a universal loader mechanism with an internal cavity of sufficient space to accommodate traverse mechanisms and OPU's of many different sizes and shapes. According to another feature, the positioning of any traverse mechanism is determined by the orientation of its turntable. The traverse mechanism is positioned within the internal cavity in a manner whereby the lateral center of the turntable coincides with the lateral center of the tray in its fully retracted position. According to yet another feature of the invention, a suitable adapter is provided to realize the proper positioning of the traverse mechanism. According to a further feature, a suitable chuck is designed to match the corresponding turntable, and a lifter with a suitable lifting height is provided to ensure that the turntable at its lifted position can interact with the chuck. Since a customized adapter and chuck is much simpler to produce than a complete loader system, the present invention reduces the overall cost of tooling, manufacturing and assembling optical disc drives.

According to the requirements of the universal loader, a different adapter may be designed to secure a corresponding traverse mechanism. Each adapter has a frame with a height, an outer edge. The frame defines a space wherein the traverse mechanism is received. The outer edge is adapted to match the interior cavity of the universal loader, and remains the same for different adapters once the design of the universal loader has been determined. The frame is also provided with attachment means for securing the adapter onto the loading mechanism, and securing means for securing the traverse mechanism with the space. The height of the frame is designed to be low enough to allow the turntable of the corresponding traverse mechanism to clear the tray. Using this design, different adapters may be molded to accommodate different traverse mechanisms, while the same universal loader can still be used.

DESCRIPTION OF THE INVENTION

The present invention provides a single transformable universal loader platform that can be reconfigured to accommodate different types of optical pickup units and traverse mechanism. It also provides an adapter and method of designing said adapter such that the same universal loader may accommodate different traverse mechanisms. Another feature is the use of a suitable chuck to match the corresponding traverse mechanism.

In the following description, numerous specific details are set forth such as the origin and interior cavity of the universal loader in order to provide a thorough understanding of the present invention. In other instances, well known elements such as the detector, motor, and gears of the loader are not described in detail in order not to unnecessarily obscure the present invention. It should be understood by one of ordinary skill in the art that a loader may contain different types of detectors, motors, gears, trays and lifters.

Figure 1A:
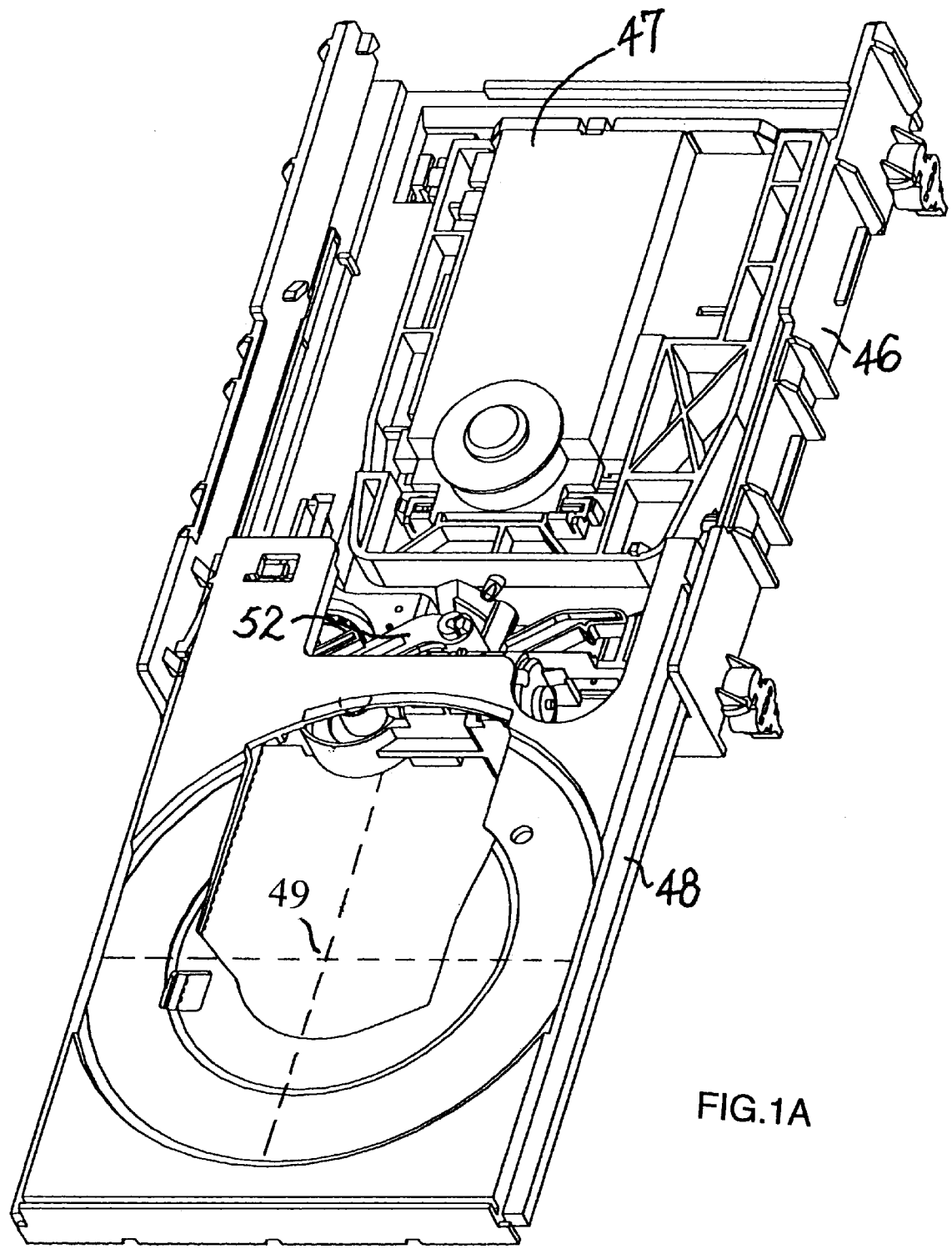
FIG. 1A is a perspective view of an optical disc drive containing a loader mechanism according to the present invention, and a traverse mechanism from Philips Corporation.
Figure 1B:
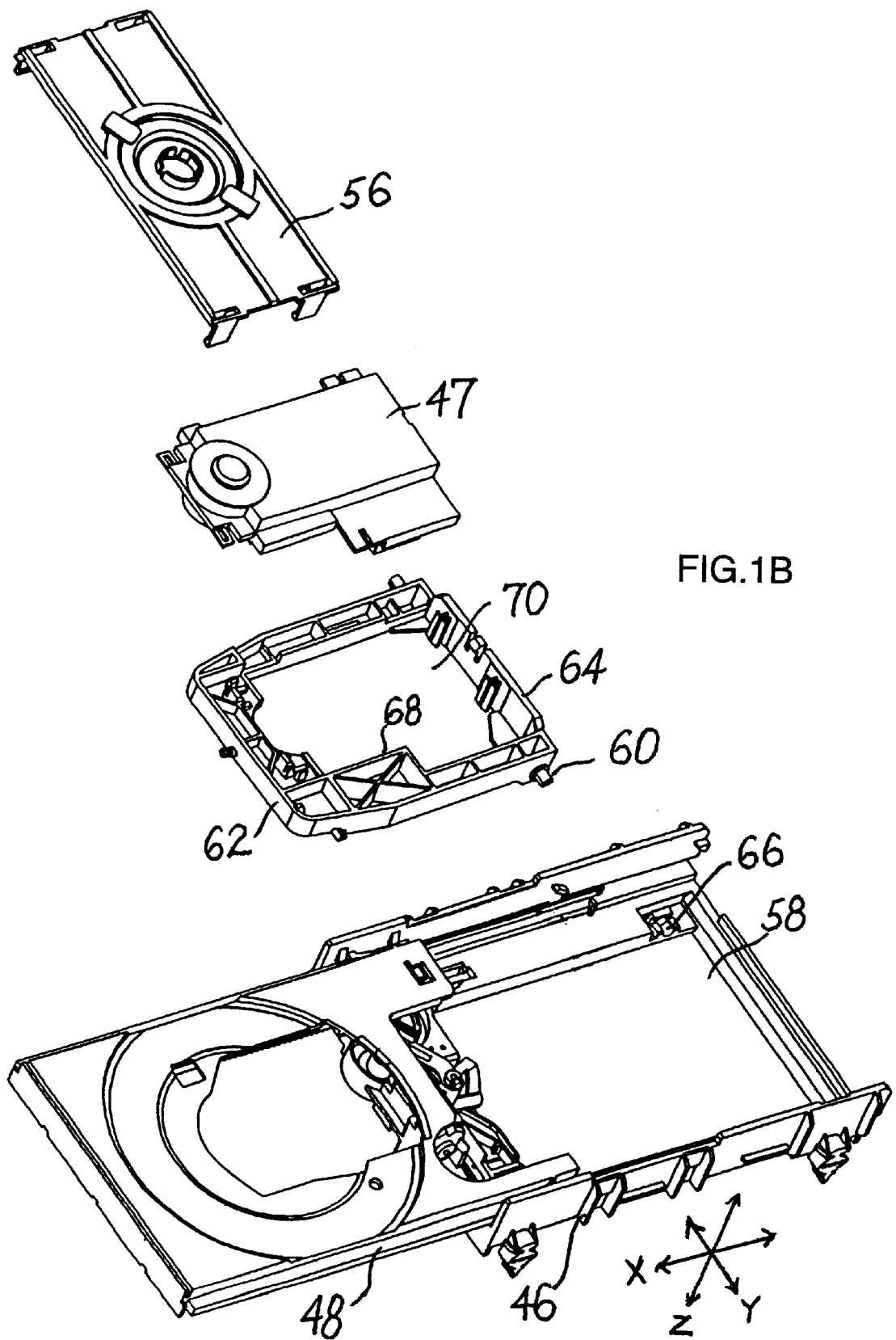
FIG. 1B is an exploded view of the optical disc drive in FIG. 1A.

FIGS. 1A and B show an example of a universal loader platform with a traverse mechanism 47 from Philips Corporation according to the present invention. The universal loader may have a conventional loading mechanism, including the chassis 46, the loader tray 48, gears (not shown), lifter 52, motor (not shown), a detector for detecting the position of the tray, and chuck bar 56. In addition, an interior cavity 58 is provided to receive the adapter and traverse mechanism. As mentioned previously, the dimensions of this interior cavity should be large enough to accommodate all the traverse mechanisms in their appropriate positioning for which the universal loader is designed to receive. The lateral center 49 of the loader tray in its fully retracted position coincides with the lateral center of the chuck and also the center of rotation of the optical disc. A lateral position is defined according to the X and Y coordinates, and the vertical position is defined according to the Z coordinates as indicated according to FIG. 1B. The lateral center of the turntable should coincide with the lateral center of the chuck holder, and the body of the frame of the adapter is designed to comply with this requirement. The height of the frame of the adapter should be adapted to allow the tip of the turntable to be vertically positioned directly below the tray. This allows the tray to clear the turntable when it is sliding in and out of the loader, while giving an appropriate distance for the lifter to lift the turntable to the spinning position. The spinning position is defined as the position of the turntable after it has been lifted by the lifter, such that the optical disc is secured by the chuck holder for proper spinning by the turntable. As the X, Y and Z positions of the turntable is clearly defined within the universal loader, a suitable adapter may be designed to adapted a specific traverse mechanism into the universal loader.

Figure 1C:
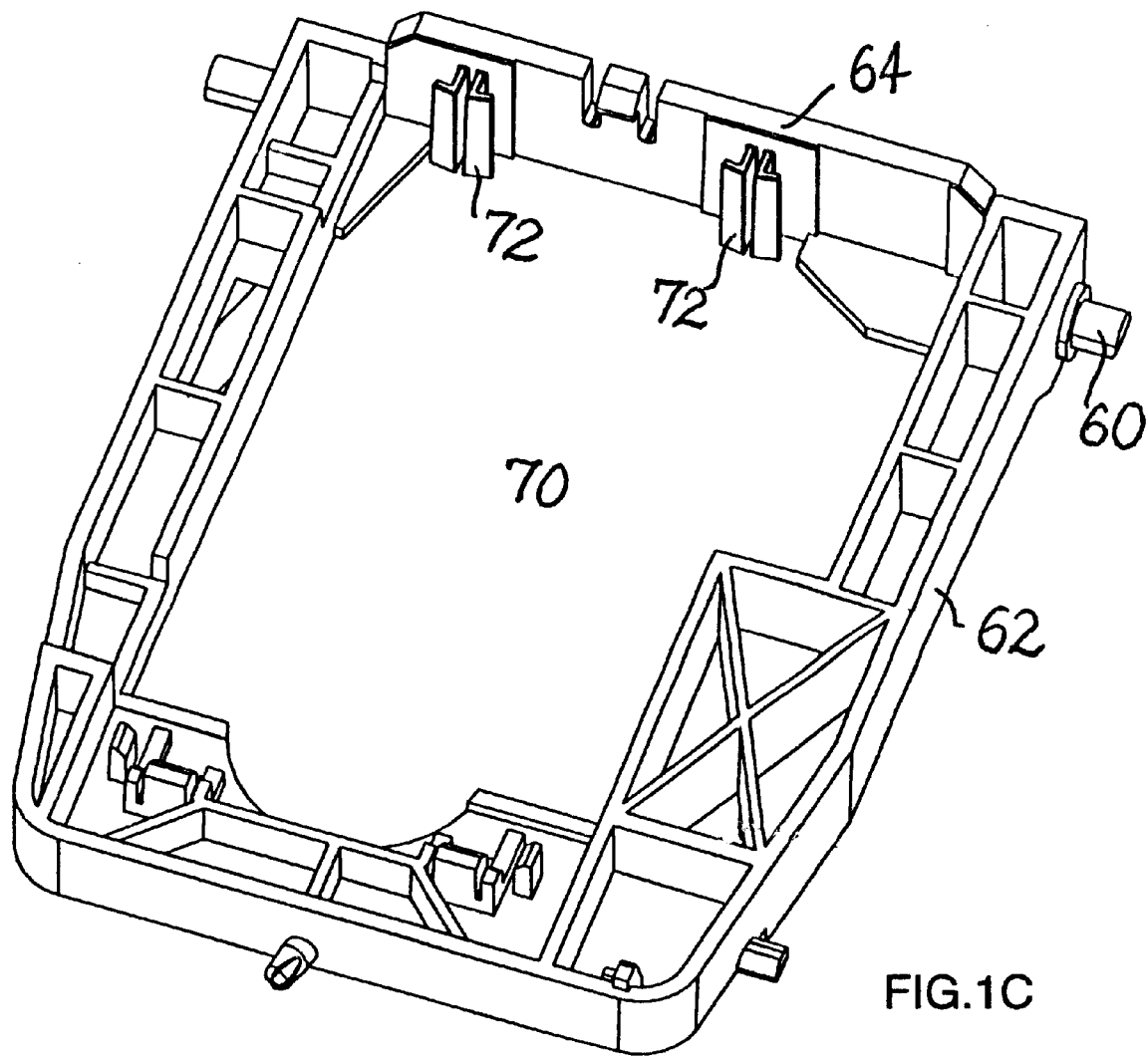
FIG. 1C is an enlarged elevated view of the same adapter as shown in FIG. 1B.

FIG. 1C shows in greater detail the adapter according to the present invention. The adapter is further provided with attachment means for attachment onto the chassis of the universal loader, and securing means for securing the traverse mechanism. In this example, the attachment means is a set of latches 60 extending from the outer edge 62 of frame 64, which are adapted for coupling to notches 66 (of FIG. 1B) in the chassis of the universal loader. The frame 64 of this adapter defines a space 70 for receiving the traverse mechanism. Two pairs of brackets 72 extend into space 70 from the frame and are used as securing means to slidably secure the Philips™ traverse mechanism into space 70.

Figure 2A:
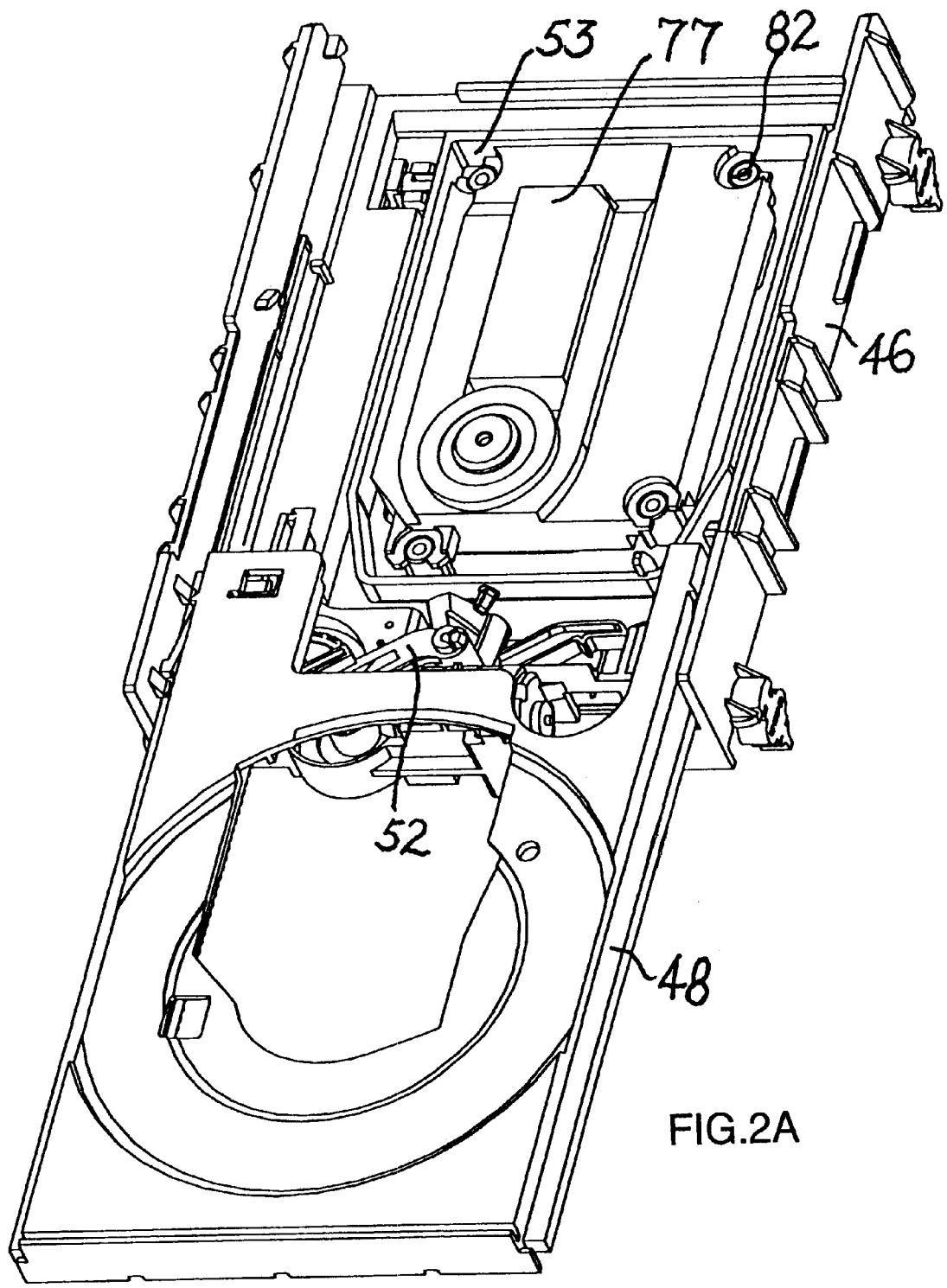
FIG. 2A is an elevated view of an optical disc drive according to another embodiment of the present invention.
Figure 2B:
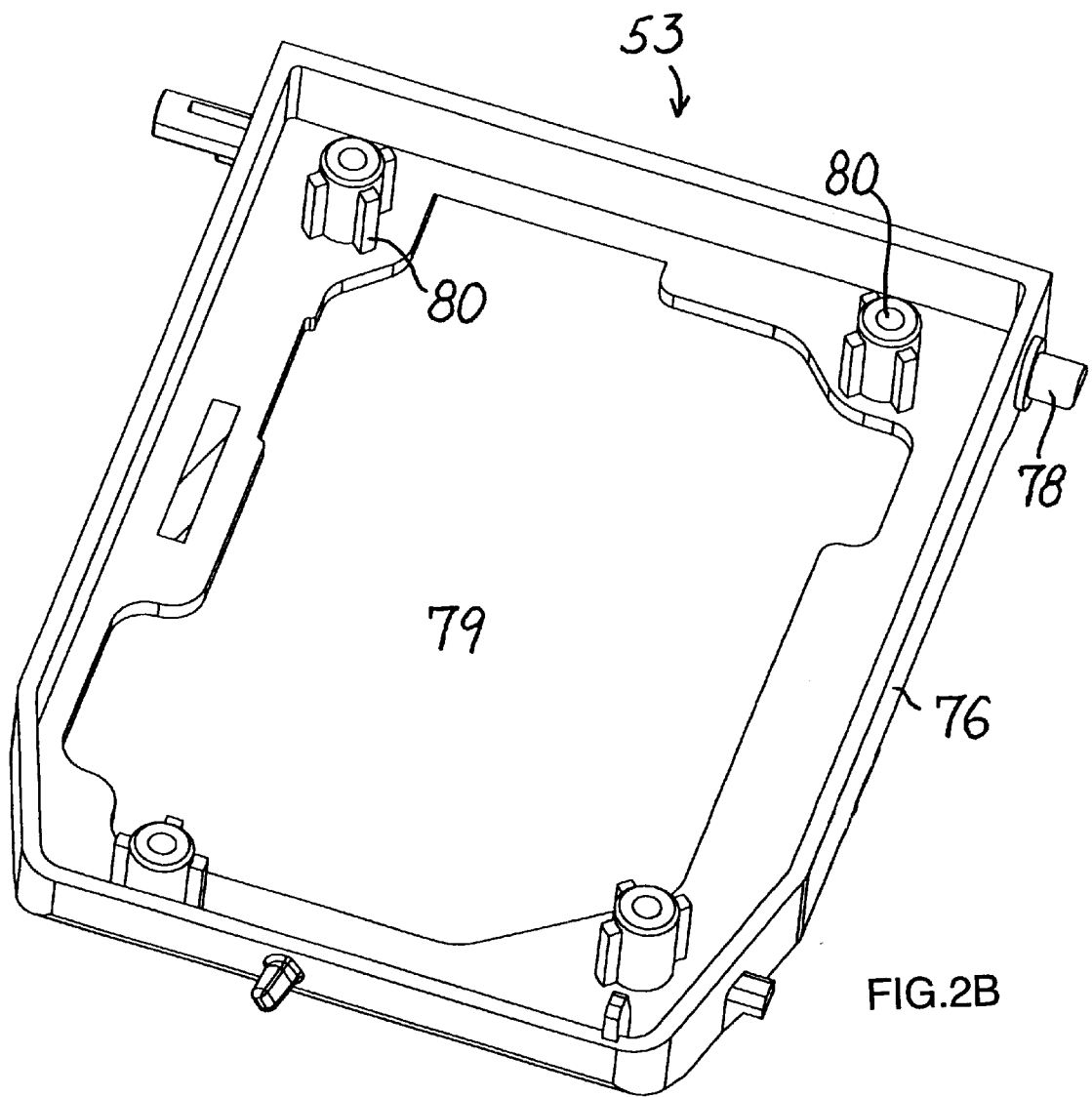
FIG. 2B is an elevated view of the adapter used in the optical disc drive in FIG. 2A.

FIG. 2A shows an optical disc drive having the same universal loader fitted with the traverse mechanism 77 from Hitachi Corporation. The loader mechanism contains the same chassis 46, tray 48, gears and lifter 52 as the embodiment in FIG. 1A. This second adapter 53 and chuck (not shown) are designed specifically for use with the Hitachi traverse mechanism. Adapter 53 is shown in greater detail in FIG. 2B. The outer edge 76 and with outwardly extending latches 78 of this frame are essentially identical to that in FIG. 1C, as both adapters are designed for the same universal loader mechanism. However, the body of this frame, and the space 79 provided therein, are different from the first adapter as this second adapter is designed to receive and position the Hitachi traverse mechanism. Nevertheless, the same design principle applies, i.e. that the adapter should secure the Hitachi traverse mechanism in such a manner as to allow the center of the turntable to coincide with the lateral center of the chuck and the tray. Furthermore, the height of the frame should allow the turntable to clear the tray when the tray is moving from the loading to the playing positions. As shown in FIG. 2B, four guide pins 80 are provided in the frame as securing means. These are designed to match and couple to the brackets 82 on the Hitachi traverse mechanism. The chuck is chosen to suit the design of the turntable, and may be determined by one of ordinary skill in the art.

Figure 3A:
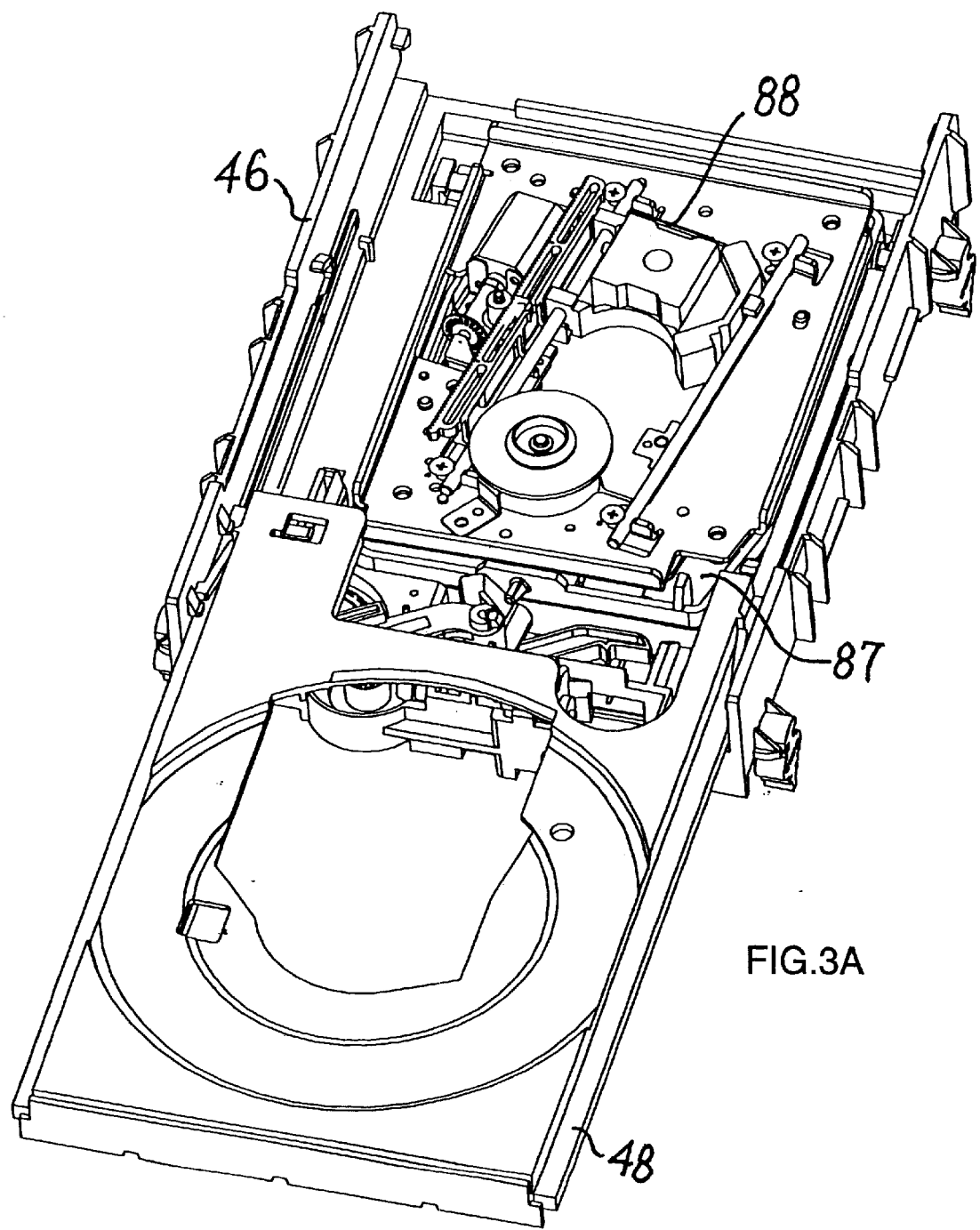
FIG. 3A is an elevated view of an optical disc drive according to yet another embodiment of the present invention.
Figure 3B:
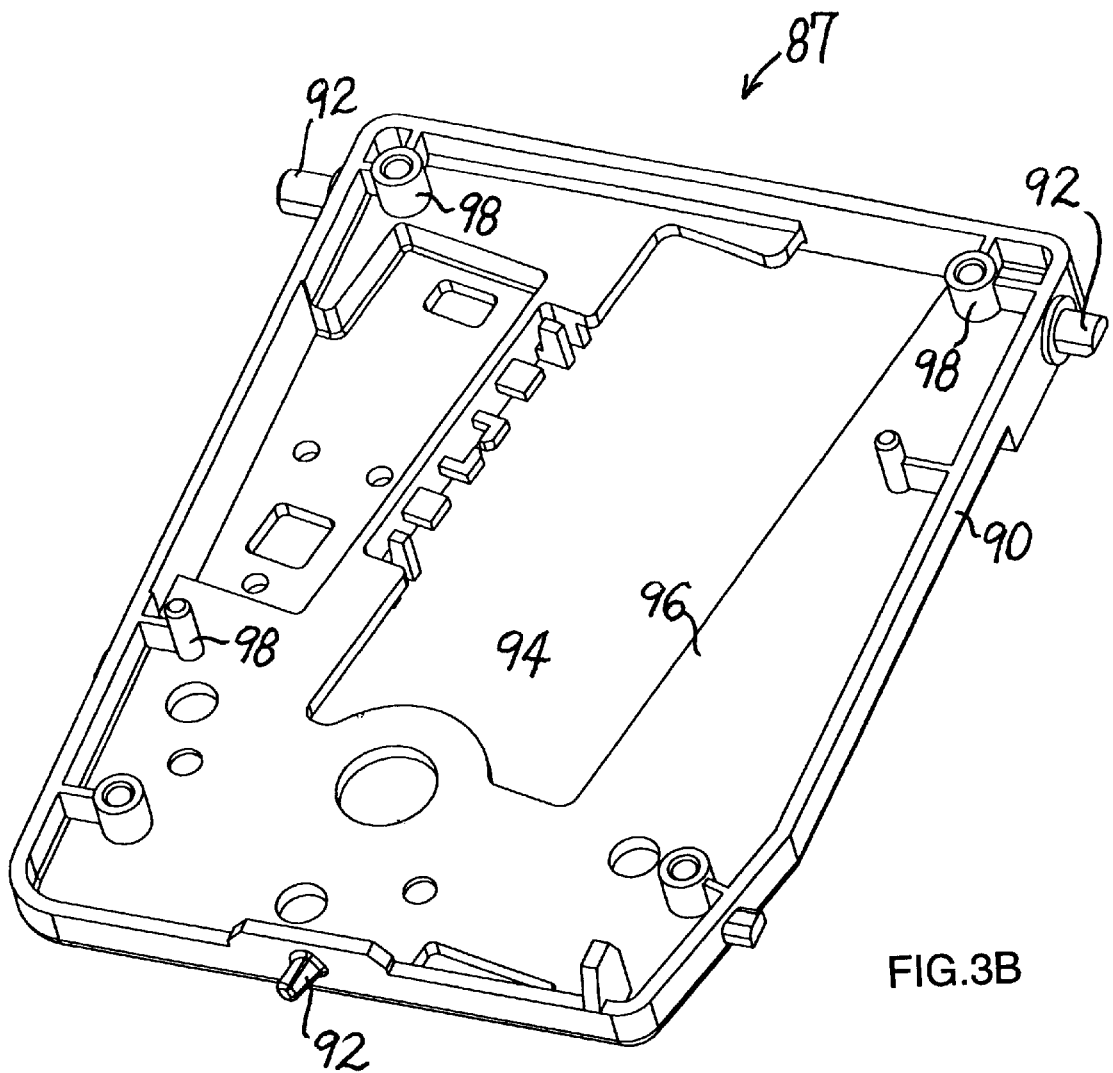
FIG. 3B is an elevated view of the adapter used in the optical disc drive in FIG. 3A.

FIGS. 3A and B show a same universal loader and a third adapter 87 designed to secure a third traverse mechanism 88. As in the previous embodiments, the outer edge 90 and the latches 92 of the frame of the adapter is the same, since they are all designed to fit into the same interior cavity of the same universal loader. Once the height of the turntable 89 in its lifted position is determined, the height of the adapter frame may be derived. In this embodiment, the frame defines a large interior space 94 which is partially enclosed by the base 96 of the frame. Guide pins 98, adapted to fit into receiving brackets provided by the third traverse mechanism, extend upwards from the base.

While the present invention has been described particularly with references to the accompanying figures with emphasis on one embodiment of a universal loader platform, it should be understood that the figures are for illustration only and should not be taken as limitation on the invention. Although the outer edges of the frames of the three adapters are preferably the same reduce design and manufacturing cost, it is clear that the method and teaching of the present invention allow universal loaders of numerous embodiments to be designed. Once the traverse mechanism design is ascertained, the design of the loader mechanism and the adapter may be derived. It is contemplated that many changes and modifications may be made by one of ordinary skill in the art without departing from the spirit and the scope of the invention described.

What is claimed is:

1. An optical storage disc drive comprising:
   a) one of a variety of traverse mechanisms having a turntable wherein,
      said one of the variety of said traverse mechanisms has at least one of a variety of arrangements of attachment means;
   b) one of a corresponding variety of adapters having a frame defining a space for receiving said one of the variety of traverse mechanisms wherein;
      said one of a corresponding variety of the adapters has one of a variety of predetermined arrangements of attachment means for coupling to said one of the variety of predetermined arrangements of attachment means of the one of the variety of said traverse mechanisms wherein;
      each of the variety of adapters has an outer edge;
   c) a loading mechanism including
      a chassis having a predetermined arrangement of attachment means for coupling to the outer edge of the corresponding variety of adapters;
      a tray, slidably connected to the top of said chassis, for receiving an optical storage disc;
      a motor and gear system, connected to said tray, for moving said tray between an extended position and a retracted position;
      a chuck bar, attached to the top of said chassis and extending across the tray in the retracted position;
      a chuck disposed on said chuck bar directly above the center of said tray in the retracted position; and
      a lifter coupled to said chassis for lifting one of the corresponding variety of said adapters;
         such that the lateral center of said turntable coincides with the lateral center of the tray in the retracted position, and the height of the turntable is lower than the height of the tray.

2. A loader mechanism according to claim 1 further comprising detecting means provided on said chassis for detecting the position of said tray.

3. A loader mechanism according to claim 1 wherein said one of a corresponding variety of adapters further comprises attachment means on the outer edge of said frame, for securing said one of a corresponding variety of adapters to said chassis of the loading mechanism.

4. A loader mechanism according to claim 1 wherein said one of a corresponding variety of adapters further comprises attachment means on an inner edge of said frame for attachment to corresponding attachments means on traverse mechanisms.

5. A loader mechanism according to claim 1 wherein said variety of adapters is made of molded plastic, metal or metal alloy.

6. An adapter comprising:

a frame having an inner edge, said inner edge having one of a variety of predetermined arrangements of attachment means for coupling to one of a variety of predetermined arrangements of attachment means of one of a variety of traverse mechanisms;

and an outer edge, said outer edge having a predetermined arrangement of attachment means for coupling to a predetermined arrangement of attachment means on a chassis of a loading mechanism.

7. An adapter according to claim 6 wherein the attachment means of said outer edge of said adapter comprises a set of latches extending from said outer edge for coupling to a set of notches on the chassis of the loading mechanism.

8. An adapter according to claim 6 wherein the attachment means of said inner edge comprises brackets and guide pins.

* * * * *